United States Patent [19]

Cassell, Jr. et al.

[11] Patent Number: 4,495,797
[45] Date of Patent: Jan. 29, 1985

[54] CAN END TESTER

[75] Inventors: Ernest W. Cassell, Jr., Sullivan County, Tenn.; Edward C. Gilliam, Washington County, Va.

[73] Assignee: Reynolds Metals Company, Richmond, Va.

[21] Appl. No.: 508,081

[22] Filed: Jun. 27, 1983

[51] Int. Cl.³ ............................................. G01M 3/04
[52] U.S. Cl. ........................................ 73/40; 73/45.2
[58] Field of Search ................ 73/40, 45.2, 45.3, 45.1, 73/49.2, 49.8; 200/591, 599

[56] References Cited

U.S. PATENT DOCUMENTS

| 3,399,563 | 9/1968 | Helms | 73/45.2 |
| 3,499,314 | 3/1970 | Roberts et al. | 73/45.2 |
| 3,792,606 | 4/1972 | Munger | 73/40 |
| 3,911,735 | 10/1975 | Di Crispino | 73/102 |
| 3,954,003 | 6/1975 | Dobbins | 73/40 |
| 4,096,736 | 6/1978 | Moshier | 73/40 |

Primary Examiner—Gerald Goldberg
Assistant Examiner—Hezron Williams
Attorney, Agent, or Firm—McDonald Alan T.

[57] ABSTRACT

An apparatus is disclosed for testing can ends for leakage. The apparatus includes a series of stations, including an entry station, one or more punishment stations, a testing station and an output station, means for transporting can ends from station to station within the apparatus and means responsive to a detection of a defective end for either alerting an operator to the situation and/or stopping the can end forming equipment until corrective action has been taken.

10 Claims, 2 Drawing Figures

CAN END TESTER

BACKGROUND OF THE INVENTION

Millions of cans of beverages, such as soft drinks and beer, are sold every day. The vast majority of these cans now include an end closing structure which includes an easy-opening feature thereon.

Such easy-opening can end features are formed in can ends by such metal working operations as drawing and scoring. Careful control of such operations is essential, since close tolerances must be maintained in order that the cans both open properly without excessive effort on the part of the consumer yet do not leak under the internal pressure of the carbonated beverage therewithin.

In order to regularly check on the quality of can ends being produced, it is common practice to test several ends produced from a can end line for every packaged sleeve of ends produced. A sleeve of ends typically contains in the order of 408 or so ends. Such testing requires that the test ends be removed from the packaging line, stored until sufficient ends for testing are collected, transporting the collected ends to a remote testing station and testing these ends on previously-known can end pressure testers. Typical of the prior-known can end testers is a Borden Model 180-B-80 tester. Such a tester forms a pocket around the end, with compressed air being forced onto the end from one side and a test for leakage of this air through the other side.

Because of the delay in testing of finished ends, it is possible for many defective ends to be produced subsequent to a defect initially occurring. Thus, it has become the practice to hold a completed pallet of can ends prior to their release for shipment until testing of the sample ends has been completed. Should a single test end fail the pressure test, current practices call for all subsequent ends produced from the line in which the defect occurred to be individually tested prior to release of any of these ends. Such a procedure is obviously time consuming and expensive of itself, as well as expensive in potentially scrapped ends which will be produced between the time the defect first appeared and the time where the defect became known.

It would be desirable, therefore, to produce an apparatus which could be integral with the can end line and which routinely tests sample ends from production substantially in real time with their production. Such an apparatus would be substantially smaller than the pressure testers commercially available, since the required capacity for such a unit will be far less than that of those currently employed. At the same time, production costs could be substantially decreased by catching and correcting a defect substantially immediately after its occurrence, thus substantially reducing the number of potentially defective ends produced after the initial defect has occurred, resulting in reduced scrap, as well as labor costs, involved in producing and testing potentially defective ends.

THE PRESENT INVENTION

By means of the present invention, these desired results have been attained. The present invention involves an apparatus for punishing and testing sample can ends which may be positioned in-line with a can end forming line. The apparatus comprises a series of can end receiving stations, including an input station, one or more punishment stations, a test station and an output station and means for transporting ends from station to station within the apparatus. The test station includes means for alerting an operator of the production of a defective end and/or means for interrupting production of the end line until a found defect is corrected.

By employing the apparatus of the present invention, a can end line operator will have nearly immediate feedback on production quality, enabling the operator to take corrective action as the defect first appears, rather than after thousands of ends have been produced.

BRIEF DESCRIPTION OF THE DRAWINGS

The can end tester of the present invention will be more fully described with reference to the drawings in which.

DETAILED DESCRIPTION OF THE PREFERRED EMBODIMENT

Figure 1:
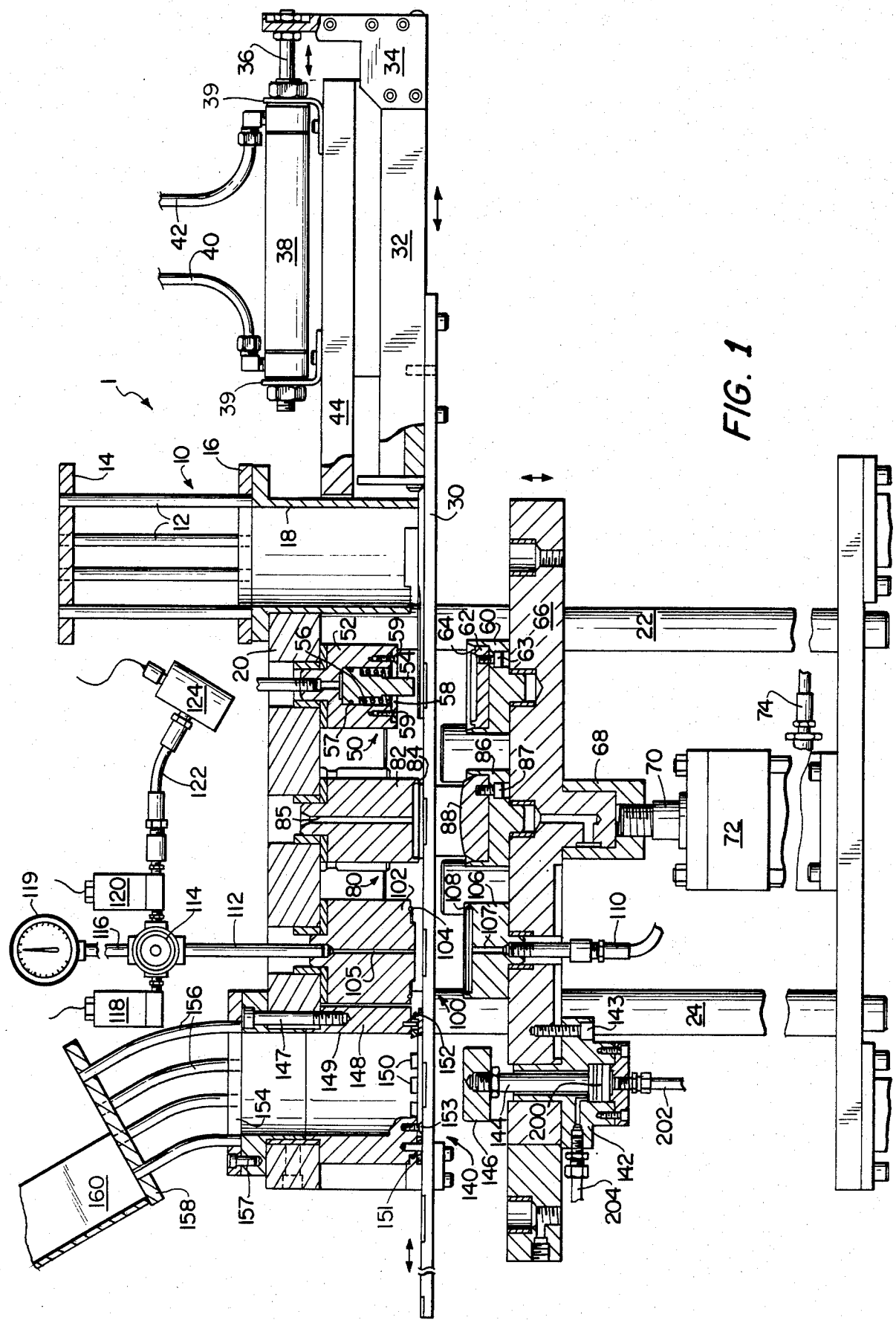
FIG. 1 is a front cross-sectional view illustrating the tooling forming the testing unit of the present invention.

Turning now to the FIGURES, the testing unit 1 of the present invention comprises a series of stations. These stations may include an input station 10, a first punishing station 50, a second punishing station 80, a testing station 100 and an output station 140. The operation of these stations will now be more fully discussed.

Input station 10 includes an input hopper 18 in which a stack of can ends may be held for testing. The hopper 18 may include an extension thereof comprising a plurality of rails 12 and end caps 14 and 16, which, as illustrated, may be vertical, or in which the rails 12 may be bent, similar to the rails 156 at output station 140 for alignment with the rest of the can end line. While, of course, this infeed hopper 18 could be fed manually, it is preferred that the hopper 18 be connected to a source of sample ends in-line with the can end forming system. Thus, for example, infeed hopper 18 could be fed from a can end sampling device such as that illustrated in co-pending U.S. application Ser. No. 508,083 filed June 27, 1983.

Figure 2:
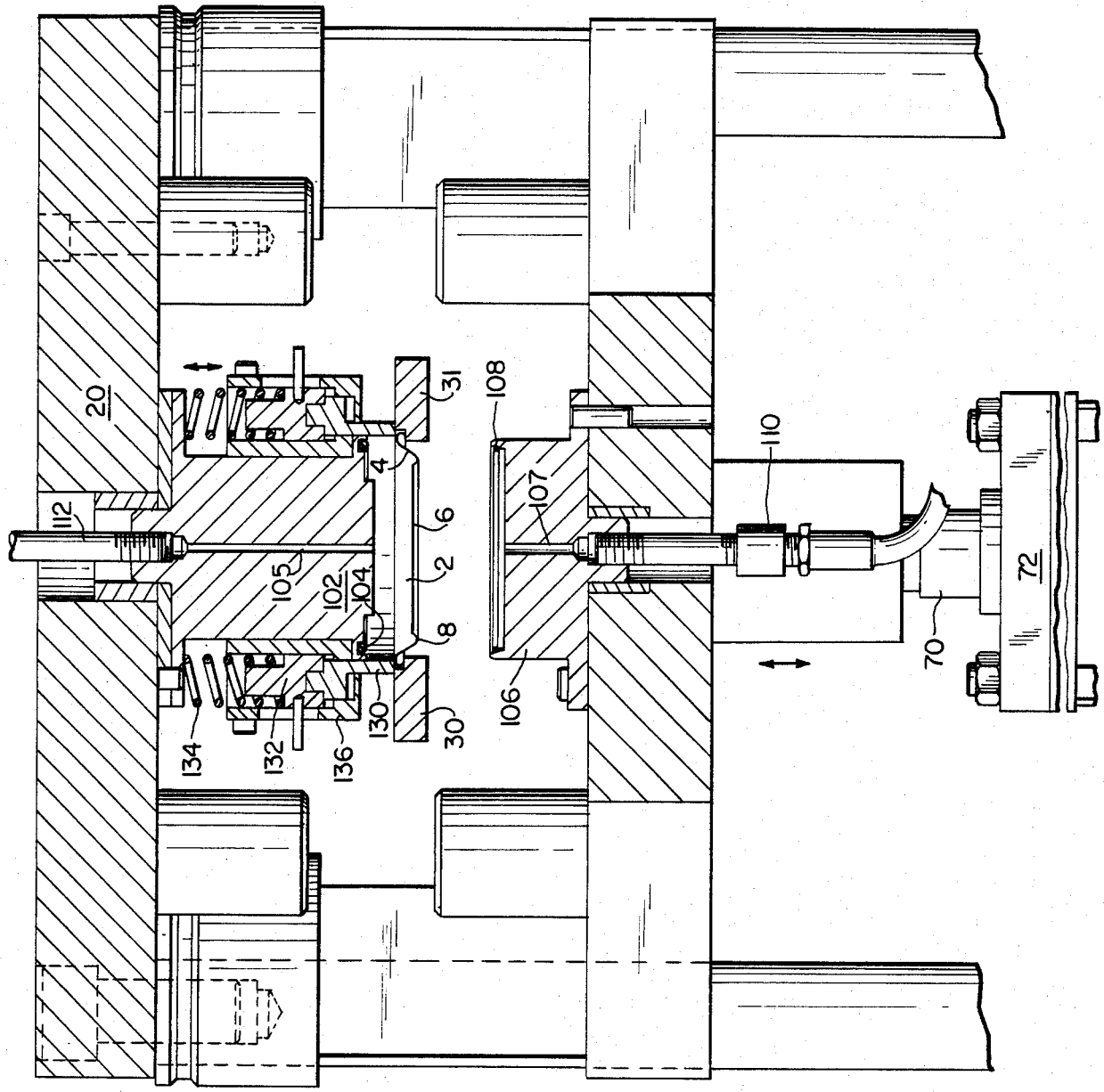
FIG. 2 is a side cross-sectional view illustrating the testing station within the testing unit of the present invention.

Located at the bottom of hopper 18 are a pair of feeding bars or rails 30 and 31. The positioning of these bars is best seen in FIG. 2. Bars 30 and 31 are connected by means of brackets 32 and 34 to a piston 36 of a double action air cylinder 38. Air cylinder 38 is connected to tester 1 by means of brackets 39 and 44.

As illustrated, the tester 1 is in its open position, i.e., the tooling forming punishing stations 50 and 80, testing station 100 and output station 140 are separated. Bars 30 and 31 have been extended to move can ends to the next station. As the tooling is closed, can ends are lifted off of the rails 30 and 31, and air is supplied through line 40 to air cylinder 38, causing piston 36 to extend and thus moving rails 30 and 31 to their retracted position, picking up a new end from hopper 18. Of course, as illustrated in FIG. 1, air has been supplied to line 42 connected to air cylinder 38, causing piston 36 to retract, extending rails 30 and 31 and moving can ends to the next station.

As can ends leave input hopper 18 along rails 30 and 31, they next enter a first punishment station 50. First punishment station 50 includes an upper die holder 52 which is suitably fastened to fixed mounting member 20.

Thus, as will be the case with all other upper die members in the unit 1, upper die member 52 is stationary. A punch member 54 is fitted within an opening of upper die member 52 and is held in place by means of spring 56, o-ring 57, face plate 58 and screws 59.

First punishing station also includes a lower die member 60 which is fixably mounted onto vertically extendable and retractable support 66. Lower die member 60 includes a can end holder 62 including nib or tip 64 which is shaped to permit a can end to fit thereover. Can end holder 62 is suitably fixed, such as by screw 63 to lower die member 60.

As is the case with stations 80, 100 and 140, station 50 has its upper die member 52 and lower die member 60 brought together and separated by means of vertical movement of lower die member support 66. This lower die member support 66 is connected by means of connecting member 68 to a piston 70 of an air cylinder 72. When air is supplied to cylinder 72 through line 74, piston 70 extends, bringing upper and lower die members of the stations 50, 80, 100 and 140 together. When air supply through line 74 ceases, piston 70 retracts, opening the stations.

As lower die member 60 rises, it lifts a can end 2 off of the rails 30 and 31, and brings the upper surface of the can end 2 in contact with punch 54. Punch 54 exerts a force on the center of the can end, which is the location of a rivot which fastens a tab onto the can end for operation of the easy-opening function of the can end. This force may be sufficient to flex the center panel 6 of the can end 2 downwardly. Further, the force will cause a potential defect in the end to fail, which will be discovered within testing station 100. Finally, lower support 66 is lowered, returning the end 2 to rails 30 and 31, and then these rails 30 and 31 are extended, as previously described, to move the can end 2 to the next station.

Positioned after punishment station 50 is an optional second punishment station 80. In this station, a lower die member 86 is secured to lower support 66 and includes a punch member 88 fastened thereto, by means such as screw 87. An upper die member 82, including a tip or nib 84 which may extend into the chuck wall 8 of can end 2 is mounted upon upper support 20. As lower support 66 is raised, the can end 2 has its center panel 6 forced upwardly, to return it to its pre-torture share before entering first punishment station 50.

Since the center panel may be held tightly between die members 82 and 88, die member 82 is vented by means of opening 85 passing therethrough, permitting air to pass through opening 85 as the center panel 4 is pushed upwardly. This prevents a vacuum from forming, which could cause the can end 2 to stick to the upper die member 82 upon reopening of the die set, causing a jam of the unit 1. With this vent 85, upon lowering of the lower support 66, the can end 2 again is returned to guide rails 30 and 31, for movement to the next station 100.

As previously mentioned, the second punishment station 80 is an optional station. There are differences of opinion as to the need to reverse-flex the center panel 6 as is accomplished in station 80. Arguments can be made that the air pressure supplied at station 100 would cause this reverse flex to occur anyway, such that the station 80 is not necessary. However, while again stating that this station is optional, it is illustrated, since, it is currently preferred to include the station 80.

Testing of the punished end 2 a occurs at station 100. This station is shown in front cross section in FIG. 1, and in side cross section in FIG. 2.

Station 100 includes an upper die member 102 which is connected to upper support 20 and lower die member 106 which is connected to lower support 66. As the lower support 66 is raised, o-ring 108 contacts the underside of chuck wall 4 and moves can end 2 against o-ring 104, causing an airtight seal between opposing sides of the can end 2 and each of the o-rings 108 and 104. As can end 2 moves upwardly, spring acting stripper arm 130 is moved upwardly against its support block 132 and spring 134, which are encased within casing 136.

After sealing has been completed, compressed air under a pressure of from about 60 to 80 lbs per square inch (42186 to 56248 kg per square meter) is passed into line 110 and, after several seconds, valve 120 is activated. If the end 2 has no leaks therein, none of this air will pass through the end 2. However, if leakage is present, some air will pass through end 102, through opening 105, line 112, junction 114 and lines 116, valve 120 and line 122. Line 116 is connected to a gauge 119, so that an operator may visually observe the process. Line 122 is connected to a pressure transducer 124 which sees an increase in air pressure and relates a signal to an alarm (not shown) and/or to the can end forming equipment to shut the line down until corrective action can be taken.

At the end of each test cycle, dump valve 118 is activated to bleed the lines 112, 116 and 122, to increase the reliability of the test.

It should be noted that sealing of the can end for testing occurs directly on chuck wall 4. In many testers, sealing does not occur directly on a can end, but rather a pocket is formed around the end with testing actually occurring each side of the pocket. It is believed that the direct sealing employed in the present apparatus gives a more accurate test of the end itself.

When lower support 66 is lowered, the can end 2 is returned to feed bars 30 and 31, which are then advanced to position the can end 2 at the final station.

Can ends 2 exit the tester 1 at outlet station 140. A punch member 146 is connected by suitable means such as die 142 and screw 143 to the lower support member 66. An outlet die 148 having an opening therein 149 sufficient to permit the can end to pass therethrough is attached by means such as screws 147 to upper support member 20. A plurality of wedge-shaped one-way stops 150, which are held in place by means of face plate 151 and screws 153 and which are mounted for lateral movement about face plate 151 by means of flexible o-ring 152, permit can end 2 to be pushed upwardly into opening 148 by punch 146, but do not permit can ends 2 to fall back onto feed bars 30 and 31.

Punch 146 is operated by an air cylinder 200 which has its cylinder rod extended by air passing through line 202 when the tester 1 is operating normally and has not detected a defective end. When a defective end is detected in test station 100, punch 146 is retracted by the air cylinder 200 allowing the defective end to be discarded out of the tester after two more successive cycles of operation. Once the defective end is discarded, the air cylinder 200 extends punch 146, which continues to upstack good ends on successive cycles of the machine until another defective end is detected.

Finally, an exit tube formed of rails 156 and face plates 154 and 158 fastened to die 148 by means of screw 157 guide the ends 2 out of the tester 1. The rails 156 may guide the can ends 2 to a stacker 160 for manual removal by the operator, or, the rails 156 could be connected to return the can ends 2 directly into the can end line for packing.

From the foregoing, it is clear that the present invention provides an apparatus for testing can ends which may be used in line with the can end forming equipment for control thereof which gives an almost immediate indication of can end quality.

While the invention has been described with reference to a certain specific embodiment thereof, it is not intended to be so limited thereby, except as set forth in the accompanying claims.

We claim:

1. An apparatus for testing can ends comprising an entry station, a first and a second punishment station, a testing station, an output station, means for transporting said can ends between adjacent stations, and means for reciprocating opposing portions of at least some of said stations, said first punishment station comprising a first die member and a first punch member, said first die member and said first punch member being constructed and arranged to provide a downwardly deflective force on a central portion of said can end and said second punishment station comprising a second die member and a second punch member, said second die member and said second punch member being constructed and arranged to provide an upwardly deflective force on said central portion of said can end.

2. The apparatus of claim 1 wherein said entry station comprises a hopper.

3. The apparatus of claim 2 wherein said entry station further comprises a plurality of rails and an end cap at each end of said rails.

4. The apparatus of claim 1 wherein said testing station comprises a pair of die members, said die members being constructed and arranged to sealingly engage said can end therebetween, means for supplying pressurized air through one of said die members to one side of said can end and means for sensing leakage of air through said can end and into the other of said die members.

5. The apparatus of claim 4 wherein said means for sensing comprises a transducer.

6. The apparatus of claim 1 wherein said output station comprises a punch member and a hopper member, said punch member including means for extending and retracting said punch member and said hopper member including means for preventing fall back of can ends entering said hopper.

7. The apparatus of claim 6 wherein said means for extending and retracting comprises an air cylinder.

8. The apparatus of claim 7 wherein said means for preventing fall back comprises wedge-shaped stop members and means for positioning said stop members.

9. The apparatus of claim 1 wherein said means for reciprocating comprises a frame member upon which said portions of said stations are mounted and an air cylinder for reciprocating said frame member.

10. The apparatus of claim 1 wherein said means for transporting comprises a pair of feed bars and an air cylinder for reciprocating said feed bars.

* * * * *